3,451,374
CURTAIN COATING APPARATUS
Victor H. Clausen and Reino A. Jarvi, Bellevue, and Arnold Zweig, Olympia, Wash., assignors to Simpson Timber Company, Seattle, Wash., a corporation of Washington
Filed Dec. 8, 1965, Ser. No. 512,412
Int. Cl. B05c 11/10
U.S. Cl. 118—7                                4 Claims

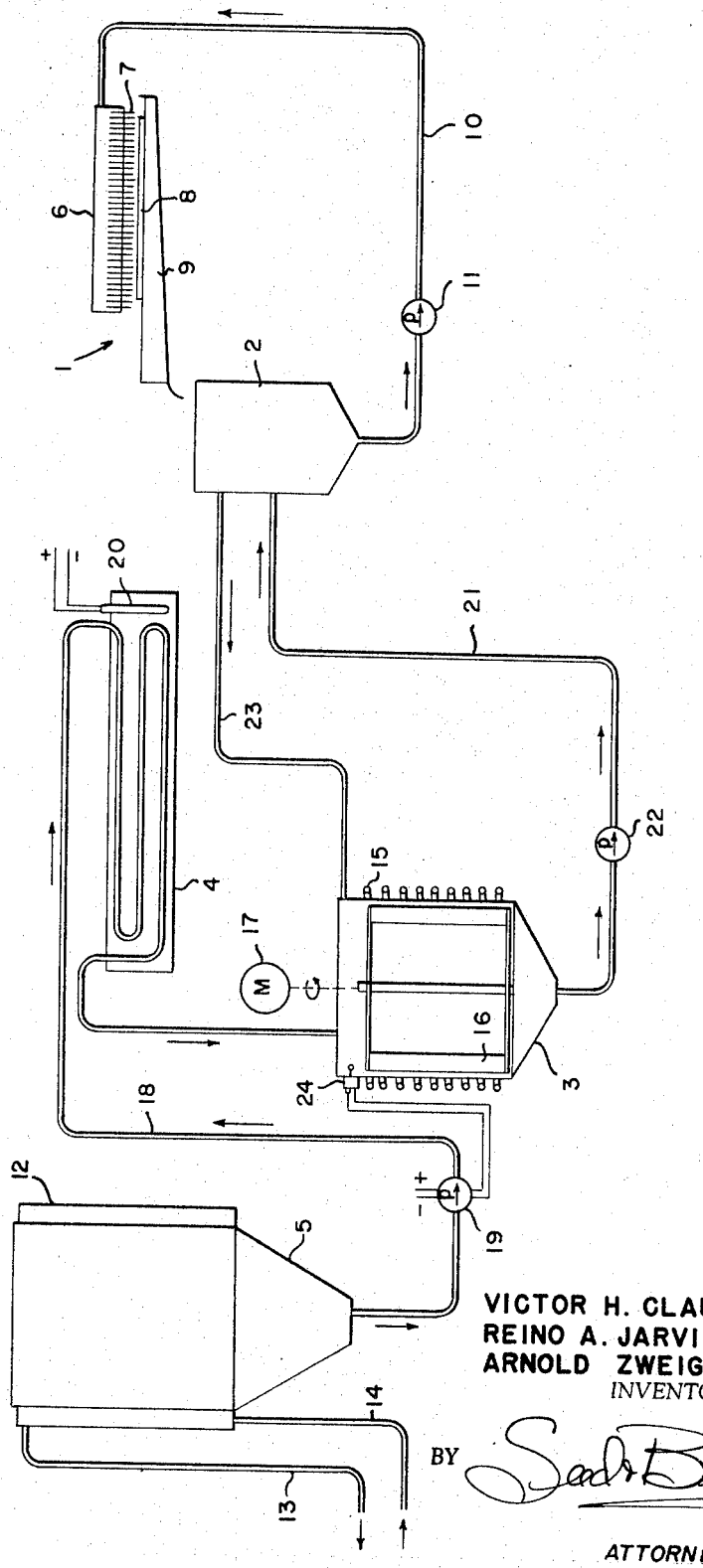

ABSTRACT OF THE DISCLOSURE

Curtain coating apparatus in which the coating material is pumped from a temperature controlled storage tank to a liquid level controlled supply tank while passing through heating means. Means are provided for recirculating the liquid between the supply tank and a reservoir tank. The liquid is then recirculated from the reservoir to the coating head from which the excess returns to the reservoir by way of a collecting trough.

---

The present invention relates in general to an apparatus for applying resin adhesive to sheet material such as wood veneer, paper, hardboard, and other cellulosic fibrous sheet material. More particularly, the present invention relates to an apparatus for applying a thin even coat of thermo setting resin adhesive such as phenolic or phenolic derivative base resin to sheet laminate material by means of a gravity type curtain coater apparatus.

In the prior art the common practice is to combine the phenolic resin with finely ground fibrous fillers as a mixed glue for application to sheet material, such as wood veneer in plywood panel layup, by means of conventional roll coating processes or, in some instances, certain spray methods are used. Glue mixes of this type are usually of advanced viscosity and cannot be held for any appreciable time in storage at normal room temperatures without setting up. It has been the practice therefore to mix this type of resin adhesive at the manufacturing plant in relatively small quantities since it could not be pre-mixed and shipped in bulk.

Many disadvantages of roll coating or spray coating of resin adhesives have been experienced which make the task of handling and spreading the adhesive difficult, resulting in high production costs of laminated material such as plywood or the like. Some of the disadvantages which may be mentioned are the inability to precisely control the spread weight of the adhesive during roll coating or spray coating and the large amount of waste experienced, either because of the excess adhesive which is applied or because of the adhesive which is dispensed but never reaches the surface being coated. The spread weight of the adhesive is usually controlled by the added fillers with substances such as wheat flour being added to prevent dry-out of highly advanced resins. It is also difficult to lay down an even coat of adhesive on certain materials such as plywood veneer which may vary slightly in thickness or have rough spots or projections which are not accommodated by roll coating methods and the rate at which the sheet material may be coated is limited.

According to the present invention, apparatus is provided for overcoming the deficiencies of prior art methods by the use of a gravity type curtain coater and associated apparatus for closely controlling the temperature and viscosity of an aqueous solution of resin adhesive. Resin adhesives suitable for use with the present invention may be prepared and shipped in bulk and stored at a plant location at a controlled temperature for as much as three to five months. The adhesive is then preheated and moved to the supply tank where it is maintained at a closely controlled spreading temperature for supply to the continuous circulating flow of the curtain coater apparatus. With the use of the gravity curtain coating method of the present disclosure, the spread weight of the resin may be precisely controlled and is unaffected by variations in thickness of the sheet material or roughness of the surface. Since the spread weight may be precisely controlled, a straight resin adhesive, i.e., without fillers or other additives, may be used. The speed at which coating may be accomplished is also greatly increased since it is not dependent upon the speed of a roll coater or the ability to spray.

Accordingly, the principal object of the present invention is to provide apparatus for applying resin adhesives to sheet material by means of a gravity type curtain coater to increase the speed and efficiency of the coating process and to reduce the cost involved in the production of laminated sheet material.

The means by which the foregoing objects and other advantages, which will be apparent to those skilled in the art are accomplished, are set forth in the following specification and claims and are illustrated in the accompanying drawing which illustrates schematically the system for handling the resin adhesive and supplying the same to a gravity type curtain coater.

Referring now to the drawing, the apparatus for practicing the present invention includes generally a conventional gravity type curtain coater unit 1 with an associated reservoir tank 2, an adhesive supply tank 3, a preheat tank 4 and a storage tank 5.

The curtain coater apparatus 1 and associated reservoir tank 2 along with the necessary piping detail, pump, etc., may be any conventional curtain coater apparatus known to the prior art, the details of which form no part of the present invention. One such curtain coating apparatus and pumping system is disclosed in detail in U.S. Patent 3,067,060. For purpose of the present disclosure, it is necessary to point out only that the curtain coater unit itself includes a pouring head 6 for discharging a continuous liquid curtain 7 which falls vertically by gravity onto the surface of a moving sheet 8 of material to be coated. The sheet 8 may be moved by means of any conventional conveyor system so as to pass through the curtain 7. The curtain 7 flows continuously with the unused liquid being collected in a trough 9 to be drained back to the reservoir tank 2. As illustrated schematically, the liquid adhesive in the tank 2 is pumped from the bottom thereof through a conduit 10 by means of a pump 11 so as to provide a continuous supply of liquid adhesive to the pouring head. For further details of the curtain coater unit per se, reference is made to Patent 3,067,060.

According to the present invention, the liquid resin adhesive which is formulated so as to be shipped in bulk to the coating plant is held in the storage tank 5 which is constantly cooled by means of a cold water jacket 12 surrounding the tank through which cold water is constantly circulated by means of the conduits 13 and 14. In most instances, the water in the tank 12 may be tap water but in any instance, the temperature of the cooling medium should be less than 60° F. and preferably in the range of 40° to 50° F. so as to insure that the adhesive in the tank 5 is maintained at a temperature less than 60° F. With the specific resin adhesive to be described, it has been found that the storage stability of the resin is from three to five months in this temperature range.

For certain coating purposes, the temperature and viscosity of the resin must be closely controlled and for this purpose, an immediate supply of liquid adhesive must be held available for the reservoir tank 2 at the coating temperature which is preferably approximately 70° F. The supply tank 3 is therefor provided with a heating coil 15 which may comprise a conventional electric resistance coil or the equivalent thereof. The liquid adhesive within the tank 3 is maintained at a constant even temperature throughout and is constantly stirred or mixed for this purpose by the rotating paddles 16 driven by an electrical motor 17 as illustrated. The adhesive is supplied to the tank 3 from the tank 5 by means of the conduit 18 by action of the pump 19. Since the adhesive within the tank 3 must be maintained at a constant temperature, the conduit 18 is bent back and forth so as to form a coil which is immersed in the preheat tank 4 which may contain any heating medium such as water or other liquid so as to raise the temperature of the adhesive coming from the tank 5 approximately 10°. The heating medium within the tank 4 may be kept at a constant temperature by means of the immersion heater 20 placed in the tank. The volume of adhesive subjected to the elevated temperature of the heated tank, and consequently the length of pipe 18 which must be contained within the tank, will depend upon the rate at which the adhesive is pumped from the supply tank 3 to the reservoir tank 2. By maintaining a quantity of the adhesive in the preheat tank, the temperature of the adhesive within the supply tank 3 will not be appreciably affected by the addition of adhesive from the storage tank.

As illustrated, the adhesive in the supply tank 3 is pumped constantly to the reservoir tank 2 through the conduit 21 by means of the pump 22 with the pump 22 being of such a capacity as to normally supply the reservoir tank 2 with the amount of adhesive being used at the curtain coater. Any excess adhesive in the tank 2 above a given quantity is returned to the supply tank 3 by means of an overflow conduit 23. The level of adhesive in the supply tank 3 may be maintained constant by means of a liquid level responsive switch 24 mounted in the tank for controlling the operation of the pump 19.

With the system described, the liquid resin adhesive is stored at a depressed temperature and a supply of adhesive at the optimum coating temperature is maintained in the tank 3 for delivery to the reservoir 2 of the curtain coater unit. With this arrangement, the temperature and viscosity of the liquid resin which is critical for curtain coating may be precisely controlled.

The resin adhesive suitable for use in connection with the present method is preferably an all resin adhesive which may be defined as resin adhesive without the presence of undissolved filler particles such as fibrous material or other fillers previously used to control the spread weight of resins when applied by roll coating or even spraying. It is essential to maintain the resin free of all undissolved particles such as dirt particles, oil or immiscible liquids or resins since such undissolved material will contribute to curtain breaks thus destroying the effectiveness of curtain coating. The resin utilized may be a water dilutable high molecular weight phenolic resin or a water dilutable low molecular weight resin or a resin formulated by a mixture of high and low molecular weight resins. In order for the resin or resin mixture to be operable in the curtain coater, it is essential that the viscosity be in the range of 220 to 540 cps. at 70° F. or at its application temperature, generally 70–75° F. The optimum viscosity has been found to be 300 cps. at 70° F. and hence is the preferred viscosity of the resin solution. It has been found that high viscosity resins which would require a higher spreading temperature are not satisfactory since the resin will advance in viscosity at the higher temperature and may not be held for any appreciable time.

The preferred resin adhesive used in practicing the method according to the present invention comprises a mixture of a highly advanced, high molecular weight, alkaline base phenolic resin, and a low molecular weight, long-flow alkaline base phenolic resin. The highly advanced resin is a phenol-aldehyde resin condensation product formulated with an alkali hydroxide catalyst in an amount expressed as equivalent to not over 10 weight percent NaOH, preferably between about 6.5 and 8 wt. percent, based on the total mix constituents of the highly advanced resin with a molar-ratio of aldehyde to phenol between about 1:1 and 3:1 and with a stroke cure at 250° F. of between about 7 and 10 seconds. The resin solids content is about 40% ±2%. The limits of the molar-ratios of the highly advanced resin ingredients to phenol are: water, 0 to 26:1; formaldehyde, 1 to 3; and sodium hydroxide 0.22 to 2.5. The low molecular weight long-flow resin is a phenol-aldehyde resin condensation product formulated with an alkali hydroxide catalyst and has an alkalinity equivalent to the alkalinity produced by sodium hydroxide in an amount between about 2.5–4 wt. percent of the total mixed constituents of the second resin, a resin solids content of about 50% ±2%, and a stroke cure at 300° F. of 10 to 14 seconds. When the adhesive resin is applied to a plywood veneer, a gel structure is formed that prevents excessive strike-in. The long-flow resin acts as a fluxing agent that causes the highly advanced resin to liquify upon the application of heat and pressure when the plywood veneers are pressed even though the highly advanced resin may have begun to dry out. As a result, the resin adhesive has relatively long assembly time and also has a relatively short pressing time.

Ingredients of two exemplary highly advanced and long-flow resins are provided in Table I.

TABLE I

| Highly advanced 40% solids (wt. percent): | Long flow 50% solids (wt. percent) |
|---|---|
| Phenol (22.4) | 34.9 |
| 37% formaldehyde (33.6) | 37.6 |
| 50% NaOH (15.6) | 7.0 |
| Water (28.4) | .5 |

The resin adhesive formulation for use in the present method also preferably includes an alkali-stable thickening agent to control the adhesive viscosity and adhesive strike-in while permitting necessary water dilution. By the term "alkali-stable" thickening agent is mean a thickening agent that is stable when boiled in a 10% NaOH solution for 24 hours. Any of the water soluble cellulose derivatives would be suitable thickening agents. Preferred thickening agents include hydroxy ethyl cellulose and carboxy methyl cellulose and methyl cellulose. The preferred amount of thickening agent is between about 0.1 wt. percent and 2.0 wt. percent of the total resin constituent.

The use of an alkali-stable surfactant is essential in the curtain coating method for the purpose of reducing the strong surface tension of the adhesive. The surfactant may be anionic or nonionic. A preferred surfactant is dodecyldiphenol ether disulphonic acid, sodium salt. A preferred nonionic surfactant is ditertiary acetylenic glycol. The preferred amount of surfactant is between 2 wt. percent and 4 wt. percent of the total resin constituent.

In addition to the thickening agent and the surfactant, water is also included in an amount between 15 wt. percent and 50 wt. percent of the total resin constituent of the adhesive.

In general, the resin adhesive described will have longer assembly and press times as the proportion of the long-flow resin is increased relative to the proportion of the highly advanced resin. When less than about 20% of the total resin components of the adhesive constitute long-flow resin, however, the dry-out characteristics of the highly advanced resin predominate. When more than about 50% of the total resin components of the adhesive constitute long-flow resin, the press time of the adhesive increases without a concomitant and proportional increase in assembly time. Thus, the preferred resin adhesive contains between about 20% and 50% long-flow resin and between about 80% and 50% of highly advanced resin.

Three exemplary resin adhesives for use in the curtain coating method of the present invention are presented in Tables II, III and IV and are based on use of the two resins presented in Table I.

TABLE II

| | Parts |
|---|---|
| Highly advanced 40% resin | 800 |
| Long flow 50% resin | 200 |
| Water | 200 |
| Surfactant (dodecyldiphenol ether disulphonic acid, sodium salt) | 30 |
| Thickener (hydroxy ethyl cellulose) | 1 |

TABLE III

| | |
|---|---|
| Highly advanced 40% resin | 500 |
| Long flow 50% resin | 500 |
| Water | 400 |
| Surfactant (dodecyldiphenol ether disulphonic acid, sodium salt) | 33⅓ |
| Thickener (hydroxy ethyl cellulose) | 1¾ |

TABLE IV

| | |
|---|---|
| Highly advanced 40% resin | 500 |
| Long flow 50% resin | 500 |
| Water | 180 |
| Surfactant (dodecyldiphenol ether disulphonic acid, sodium salt) | 33⅓ |

The adhesives of Tables II and III have viscosities at 70° F. of 300 cps. The adhesive of Table IV has a viscosity at 70° F. of 350 cps. The Table II adhesive has an assembly time exceeding 20 minutes and a press time of about 7 minutes at 300° F. on 5-ply 13/16" fir plywood. The Table III adhesive has an assembly time exceeding 30 minutes and a press time of about 8 minutes at 300° F. on 5-ply 13/16" fir plywood.

The Table IV adhesive is similar to the Table III adhesive but does not include a thickening agent. Good glue bonds are obtained but spread weights have to be cut to about 70% of the Table II adhesive spread weight to deliver an equivalent amount of resin solids to the glue line. Thus, absence of a thickening agent requires a thinner curtain with greater susceptivity to curtain breaks. A thickening agent serves a useful function in permitting a slightly heavier curtain at greater water dilution and better curtain stability.

Table V presents optimum adhesive spread weights on 3/16" veneer for the Table II and III adhesives.

TABLE V

| | Spread weight, grams/A$^2$ single glue line |
|---|---|
| Table II adhesive | 11.0–11.5 |
| Table III adhesive | 12.0–12.5 |

For 1/10" veneer, the adhesive spread weight required is 1–1.5 grams/ft.$^2$ of single glue lines less than for 3/16" veneer shown in Table V.

Having thus described the invention, what is claimed as new and desired to be secured by Letters Patent is:

1. Apparatus for spreading liquid adhesive resin comprising in combination; a curtain coater apparatus having means to maintain a continuous unbroken curtain of liquid adhesive, a supply tank means for maintaining a supply of said adhesive at a constant spread temperature, reservoir tank means for receiving adhesive from said supply tank first pump end conduit means maintaining a constant flow of adhesive from said reservoir tank to said curtain coater apparatus, collecting trough means for receiving unused adhesive from said coater and returning it to said reservoir tank, means coupling said reservoir and supply tanks for transferring adhesive between them, storage tank means for maintaining a supply of said adhesive at a constant storage temperature below said spread temperature, and second pump and conduit means for supplying adhesive to said supply tank from said storage tank to maintain a constant level in said supply tank.

2. Apparatus for coating a liquid adhesive resin on moving sheet material comprising; a curtain coater unit including a pouring head for discharging a continuous unbroken curtain of liquid adhesive onto a moving sheet, an adhesive reservoir tank, collecting trough means positioned to receive unused adhesive from said pouring head and return said unused adhesive to the reservoir tank, first pump and conduit means to provide a constant flow of adhesive from the reservoir tank to the pouring head, an adhesive supply tank, means to maintain the adhesive within said supply tank at a predetermined spread temperature, second pump and conduit means for supplying adhesive from said supply tank to said reservoir, overflow conduit means providing return flow of adhesive above a predetermined level from the reservoir tank to the supply tank, an adhesive storage tank, means to maintain the adhesive within said storage tank at a predetermined storage temperature below said spread temperature, third pump and conduit means for supplying adhesive from the storage tank to the supply tank, and level responsive switch means in said supply tank to control said third pump means to maintain a constant level in said supply tank.

3. The combination according to claim 2 including, means to preheat a predetermined quantity of the adhesive in said second conduit means to said spread temperature.

4. The combination according to claim 3 wherein said supply tank means includes agitating means for constantly mixing the adhesive therein.

References Cited

UNITED STATES PATENTS

| | | | |
|---|---|---|---|
| 1,346,898 | 7/1920 | Kingsbury | 137—394 X |
| 2,875,094 | 2/1959 | Bloem et al. | 118—612 X |
| 2,915,023 | 12/1959 | Rapaport | 118—602 X |
| 3,021,779 | 2/1962 | Sollich. | |
| 3,067,060 | 12/1962 | Glaus | 118—324 X |
| 3,172,777 | 3/1965 | Pano et al. | 118—324 X |

ROBERT W. MICHELL, *Primary Examiner.*

J. P. McINTOSH, *Assistant Examiner.*

U.S. Cl. XR

118—602, 612